(12) United States Patent
Roush et al.

(10) Patent No.: US 7,350,849 B2
(45) Date of Patent: Apr. 1, 2008

(54) ONE-PIECE PLASTIC RETAINER WITH INTEGRATED WATER MANAGEMENT FEATURE

(75) Inventors: Greg Roush, Saline, MI (US); Paul Jabra, Troy, MI (US); Len Marshick, Belleville, MI (US); Don Wallace, Riverview, MI (US); Greg Tarpinian, Woodhaven, MI (US); Rick Rufenacht, Lambertville, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 5 days.

(21) Appl. No.: 11/101,759

(22) Filed: Apr. 8, 2005

(65) Prior Publication Data

US 2005/0235573 A1    Oct. 27, 2005

Related U.S. Application Data

(60) Provisional application No. 60/560,930, filed on Apr. 9, 2004.

(51) Int. Cl.
*B60J 10/08*    (2006.01)

(52) U.S. Cl. .................. 296/146.9; 49/441; 49/493.1

(58) Field of Classification Search ............ 296/146.9; 49/489.1, 498.1, 475.1, 490.1, 500.1, 493.1; 52/716.5, 716.1, 716.6, 717.06
See application file for complete search history.

(56) References Cited

U.S. PATENT DOCUMENTS

| | | | | |
|---|---|---|---|---|
| 5,042,873 A | * | 8/1991 | Yagami | 296/218 |
| 5,050,349 A | * | 9/1991 | Goto et al. | 49/489.1 |
| 5,261,188 A | * | 11/1993 | Vaughan | 49/377 |
| 5,331,768 A | * | 7/1994 | Takeuchi | 49/493.1 |
| 5,347,758 A | * | 9/1994 | Yamane | 49/484.1 |
| 5,356,194 A | * | 10/1994 | Takeuchi | 296/146.9 |
| 5,367,830 A | * | 11/1994 | Omura et al. | 49/475.1 |
| 5,369,914 A | * | 12/1994 | Takeuchi | 49/495.1 |
| 5,462,292 A | * | 10/1995 | Yamane | 49/484.1 |
| 5,527,583 A | * | 6/1996 | Nozaki et al. | 296/146.9 |
| 5,649,405 A | * | 7/1997 | Morihara et al. | 296/146.9 |
| 5,775,768 A | * | 7/1998 | Yamane | 296/146.9 |
| 5,791,722 A | * | 8/1998 | Nozaki et al. | 296/146.9 |
| 5,806,914 A | * | 9/1998 | Okada | 296/146.9 |
| 5,992,021 A | * | 11/1999 | Takeda et al. | 296/146.9 |
| 6,115,967 A | * | 9/2000 | Warnecke | 49/377 |
| 6,205,712 B1 | * | 3/2001 | Ellis | 49/441 |
| 6,226,953 B1 | * | 5/2001 | Uno et al. | 52/716.5 |
| 6,412,226 B1 | * | 7/2002 | Nozaki et al. | 49/441 |
| 6,536,833 B2 | * | 3/2003 | Nozaki | 296/146.9 |
| 6,536,834 B2 | * | 3/2003 | Yamashita et al. | 296/146.9 |
| 6,598,348 B2 | * | 7/2003 | Palicki | 49/479.1 |
| 6,625,931 B2 | * | 9/2003 | Omori et al. | 49/440 |
| 6,640,499 B2 | * | 11/2003 | Yamashita et al. | 49/484.1 |
| 6,668,488 B2 | * | 12/2003 | Nozaki et al. | 296/146.2 |
| 6,723,414 B2 | * | 4/2004 | Aritake et al. | 296/146.2 |

(Continued)

*Primary Examiner*—Kiran B. Patel
(74) *Attorney, Agent, or Firm*—Fay Sharpe LLP

(57) ABSTRACT

A one-piece retainer is preferably an injection molded that receives and retains a weatherseal therein. The retainer assembly includes first and second portions that are bonded together to form the one-piece retainer. Fasteners further aid in securing the portions together and also securing the assembly to the associated vehicle. An outer show surface portion overlies a door body side of the vehicle. The show surface covers a cavity that serves as a water management channel around the perimeter of the window opening.

15 Claims, 14 Drawing Sheets

U.S. PATENT DOCUMENTS

| | | | |
|---|---|---|---|
| 6,777,068 B2 * | 8/2004 | Teramoto et al. | 428/318.6 |
| 6,824,279 B2 * | 11/2004 | Shigesada et al. | 359/870 |
| 6,938,378 B2 * | 9/2005 | Nozaki et al. | 49/498.1 |
| 6,964,133 B2 * | 11/2005 | Aritake et al. | 49/479.1 |
| 7,055,285 B2 * | 6/2006 | Nozaki | 49/479.1 |
| 7,070,224 B2 * | 7/2006 | Tsuchida | 296/135 |
| 2002/0035806 A1 * | 3/2002 | Yamashita et al. | 49/498.1 |
| 2003/0177701 A1 * | 9/2003 | Yamashita et al. | 49/489.1 |
| 2004/0025440 A1 * | 2/2004 | Yanagita et al. | 49/493.1 |
| 2005/0235573 A1 * | 10/2005 | Roush et al. | 49/493.1 |

* cited by examiner

ONE-PIECE PLASTIC RETAINER WITH INTEGRATED WATER MANAGEMENT FEATURE

CROSS-REFERENCE TO RELATED APPLICATIONS

This application claims priority from U.S. Provisional Patent Application Ser. No. 60/560,930 filed Apr. 9, 2004 and is incorporated herein by reference.

BACKGROUND OF THE INVENTION

The present disclosure generally relates to a weatherstrip mounting structure and, more particularly, is concerned with a one-piece seal plastic retainer for a vehicle.

It is known to provide a weatherstrip mounting structure for an automotive vehicle that secures a glass edge seal, and also seals against the body. This mounting structure is typically a multiple component assembly in which the A pillar and header forms one piece, and abuts against a second piece that extends generally along the B pillar. For example, a first metal retainer piece joins up with a second metal retainer piece which, when joined, receive a plastic retainer first piece and a plastic retainer second piece, respectively. Thus, four separate components are joined together to function as a combined metal/plastic retainer that receives a glass edge seal along the A pillar, header, and B pillar portions of the glass. The four-piece retainer functionally retains the glass edge seal, and itself seals against the body.

Unfortunately, the conventional retainer results in a distinctive joint line where the four individual components are brought together. The retainer also requires separate assembly of these four individual components to obtain a glass edge seal that functionally secures the glass edge seal to the vehicle body.

Where possible, it is always desirable to remove cost and assembly from the vehicle. Here, four individual components are separately manufactured and assembled together. Tolerance stack-up issues are always a potential problem where individual components are joined together, and subsequently joined to the vehicle. Likewise, the associated cost of assembly is a burden that the OEM would like to reduce, particularly assembly of the individual retainer components to the vehicle. Still further, the retainer still results in an undesirable joint line that is evident on the show surface where the individual components of the retainer assembly are joined. The joint line is usually formed along the header portion adjacent the B pillar of the vehicle.

In light of the foregoing, it becomes evident that there is a need for an improved seal retainer that would provide a solution to one or more of the deficiencies from which the prior art and/or conventional weatherstrip mounting structures have suffered.

SUMMARY OF THE INVENTION

An exemplary embodiment of a one-piece plastic retainer is provided. The one-piece plastic retainer is molded to provide a retainer with a show surface free of a joint line at the typical B pillar/header transition.

A two-shot molded arrangement is provided such that a first portion of the retainer is formed in the first shot, and the second portion of the retainer is formed in the second shot.

The first and second, portions have overlapping regions which are spot welded together at space locations along the length of the retainer as it proceeds from the A pillar, along the header, and continuously along the B pillar. Also periodically spaced along this length of the retainer are individual fasteners that extend through the overlap regions and secure the retainer to the vehicle.

A foam tape is secured to a surface of the retainer that faces the body and includes slots or openings at desired locations to allow the fasteners to extend therethrough.

A primary benefit resides in the reduced costs associated with the retainer.

Another benefit is the improved aesthetics of the show surface by eliminating the joint line associated with prior arrangements.

Yet another benefit of a one-piece molded show surface is the ability to transition from a constant environment for sealing to the glass to-a non-constant environment for styling purposes, i.e., the appearance against the sheet metal which varies relative to the glass edge.

A further benefit relates to the substantial decrease in weight as a result of using lighter weight, plastic components instead of metal as used in conventional arrangements.

Still other features and benefits of the invention will become apparent to those skilled in the art upon reading and understanding the following detailed description.

BRIEF DESCRIPTION OF THE DRAWINGS

The present invention may take physical form in certain parts and arrangements of parts, preferred embodiments of which will be described in detail in this specification and illustrated in the accompanying drawings which form a part of the invention.

DETAILED DESCRIPTION OF THE INVENTION

The description and drawings herein are merely illustrative and various modifications and changes can be made to the components and arrangement(s) of components without departing from the spirit of the invention. Like numerals refer to like parts throughout the several views.

Figure 1:
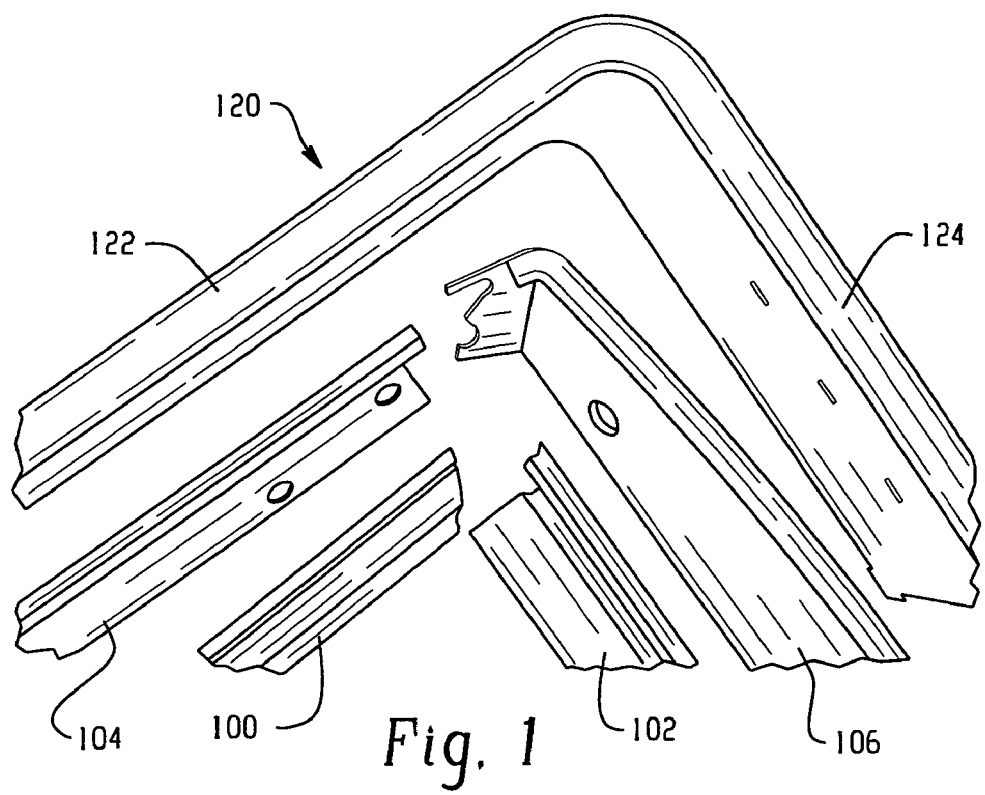
FIG. 1 is an image illustrating the one-piece plastic retainer of the subject invention shown adjacent to the four-piece retainer assembly of the prior art.
Figure 2:
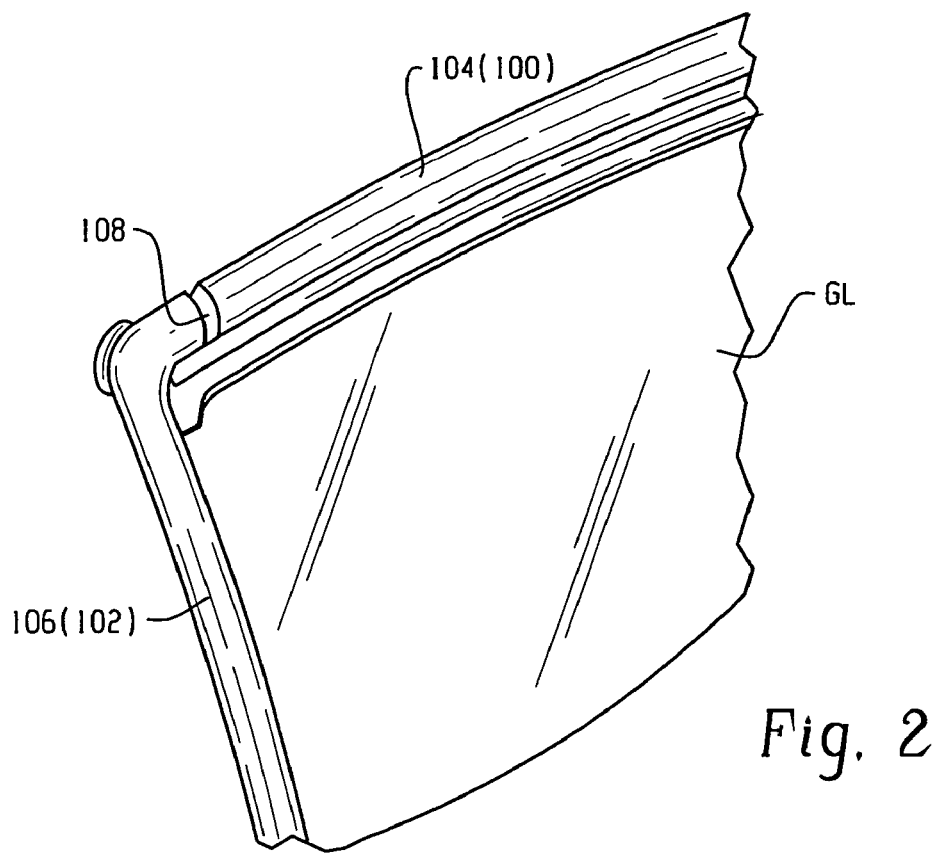
FIGS. 2-4 are images showing the joint line associated with the prior arrangement.
Figure 3:
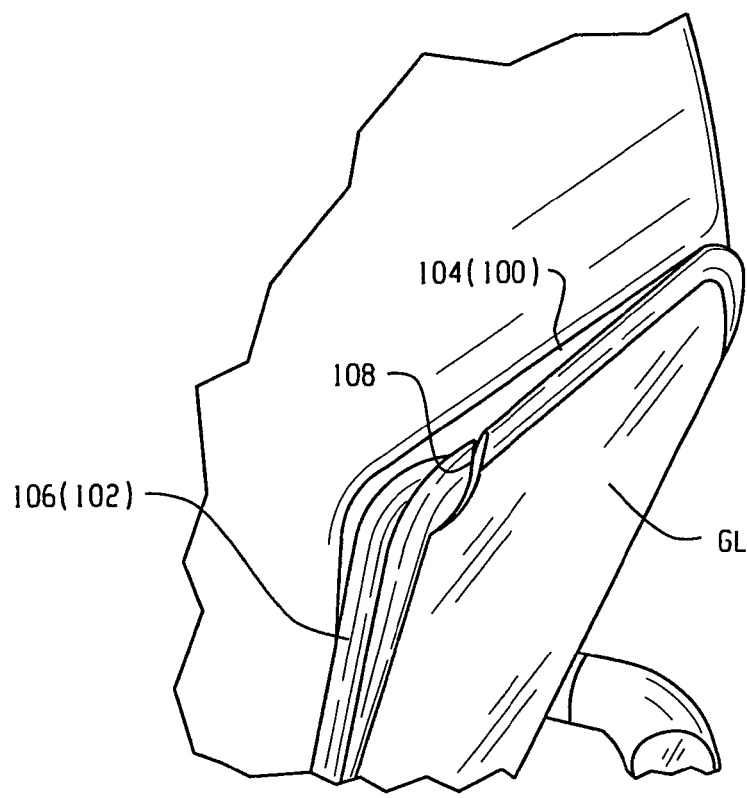
Figure 4:
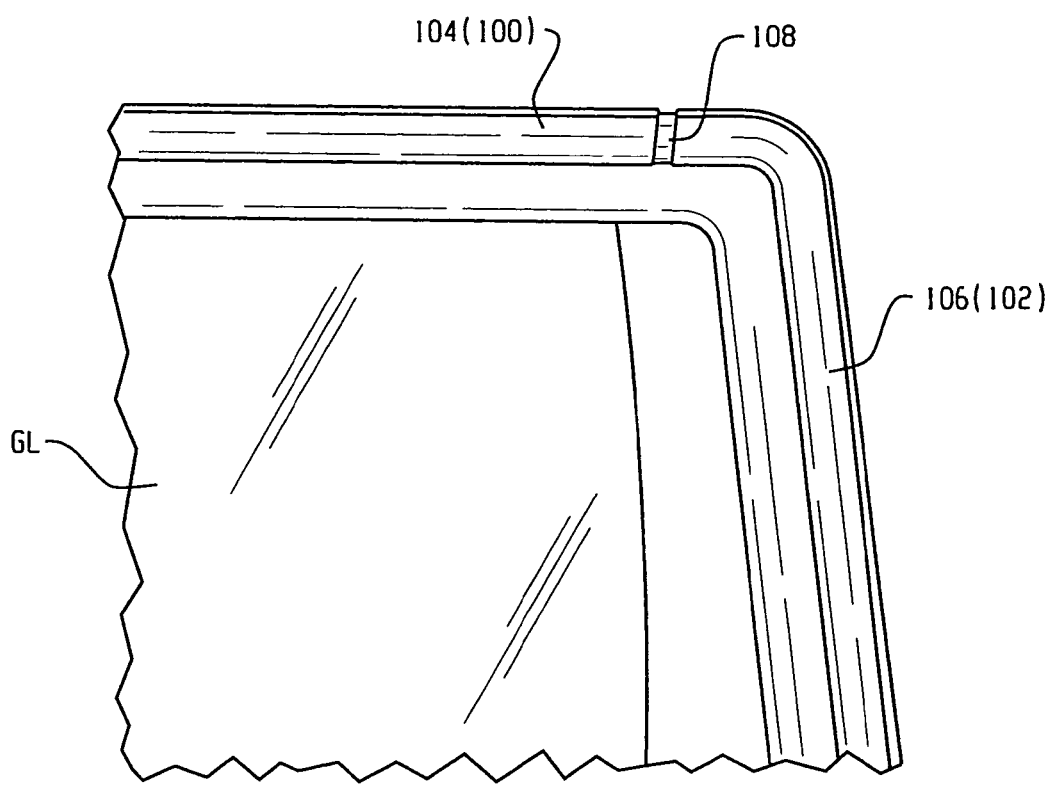

With reference to FIG. 1, first and second metal retainer pieces 100, 102 are shown in a separated condition (it being understood that only portions of each retainer piece are illustrated in this view) and first and second plastic retainer pieces 104, 106 are similarly illustrated in unassembled relation. As noted in the Background, this is a typical or conventional four-piece retainer assembly, in which the metal retainer pieces 100, 102 are joined together, and likewise the plastic retainer pieces 104, 106 are assembled together. The metal retainer assembly 100, 102 and the plastic retainer assembly 104, 106, are ultimately joined to the vehicle. For example, the metal retainer 100 extends along the so called "A" pillar and header portion of the vehicle, while metal retainer piece 102 extends along the so called "B" pillar. When assembled, and as shown in FIGS. 2-4, a discrete joint line 108 is evident in the region of transition between the header and the B pillar of the vehicle. Thus, components 102, 106 are typically secured along the B pillar portion of the vehicle as shown in FIGS. 2-4, while A pillar/header portions are comprised of components 100, 104.

Figure 5:
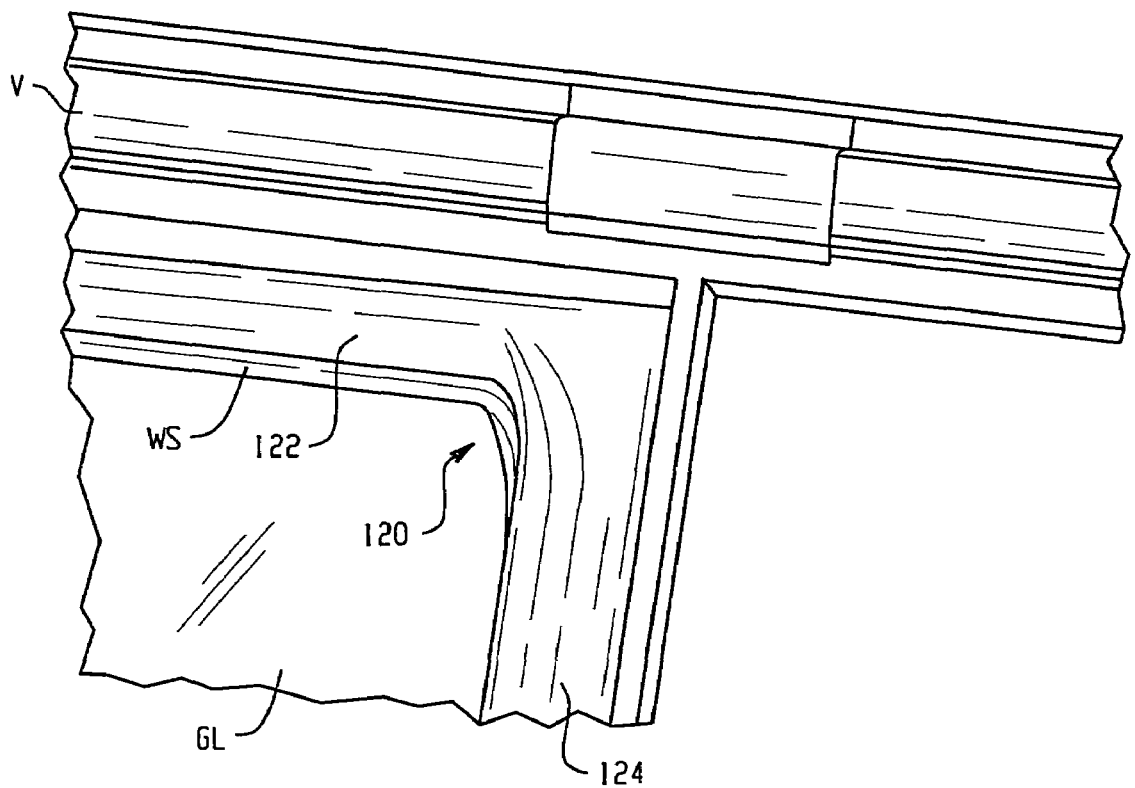
FIG. 5 is an image illustrating the header to B pillar transition region of the one-piece retainer of the subject invention.

With continued reference to FIG. 1, a one-piece plastic retainer 120 of the present application is shown in part. It includes the one-piece A pillar/header portion 122 and B pillar portion 124. As perhaps best illustrated in FIG. 5, the one-piece retainer 120 is installed on a vehicle V with header portion 122 and B pillar portion 124 retaining weatherseal WS that seals along two edges of the window or glass GL. As is evident in FIG. 5, the one-piece retainer does not include a seam along the show surface thereof.

Figure 6:
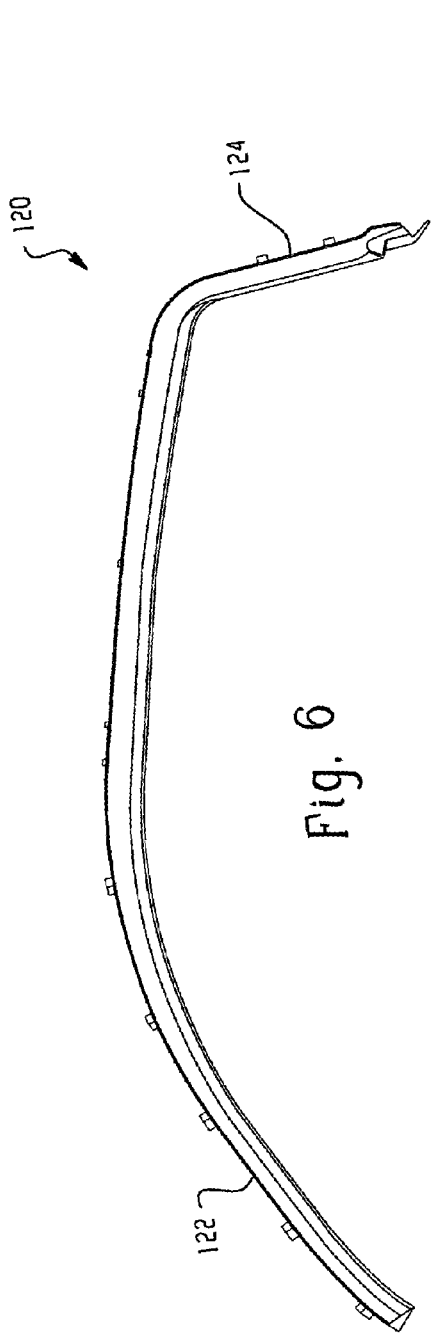
FIGS. 6 and 7 are isometric views of the one-piece retainer assembly.
Figure 7:
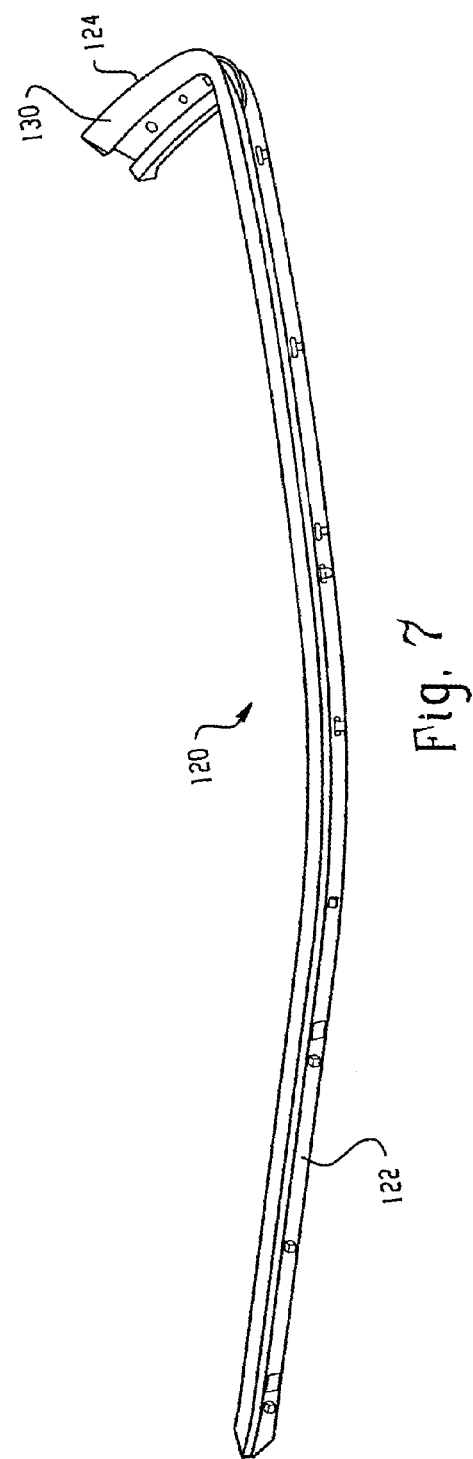
Figure 8:
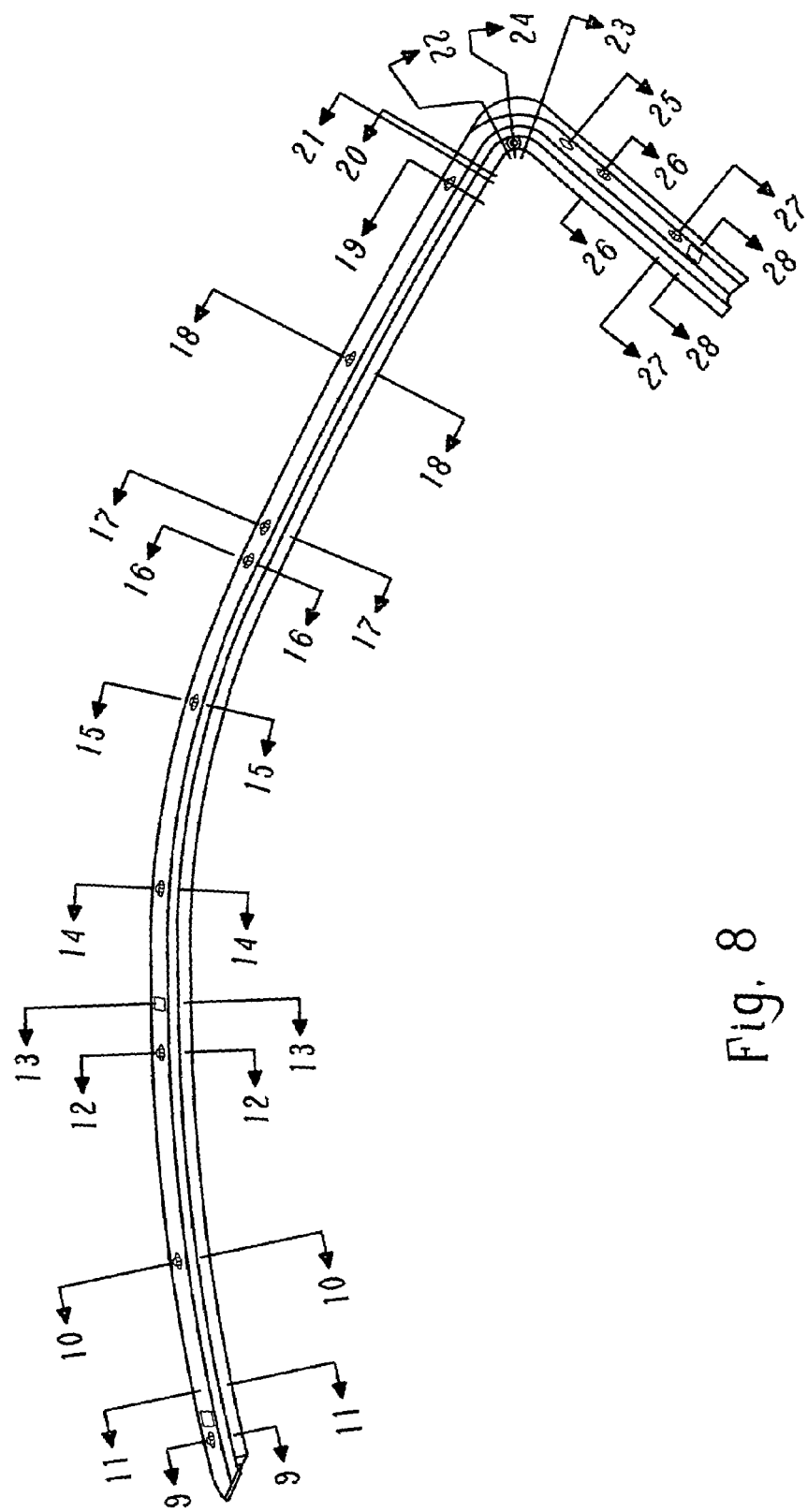
FIG. 8 is an elevational view of the retainer.
Figure 9:
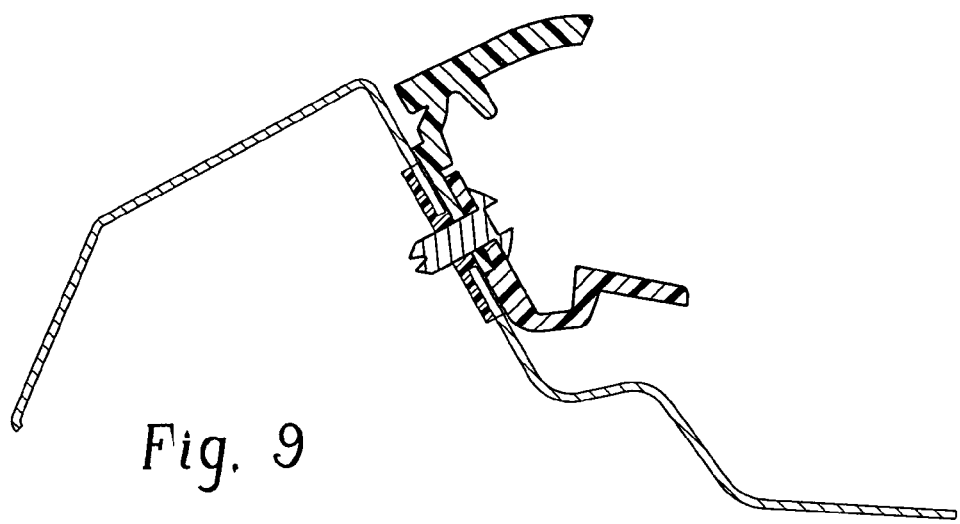
FIGS. 9-28 are sectional views taken generally along the lines 9-9, 10-10 . . . 28-28, etc. of FIG. 8.
Figure 10:
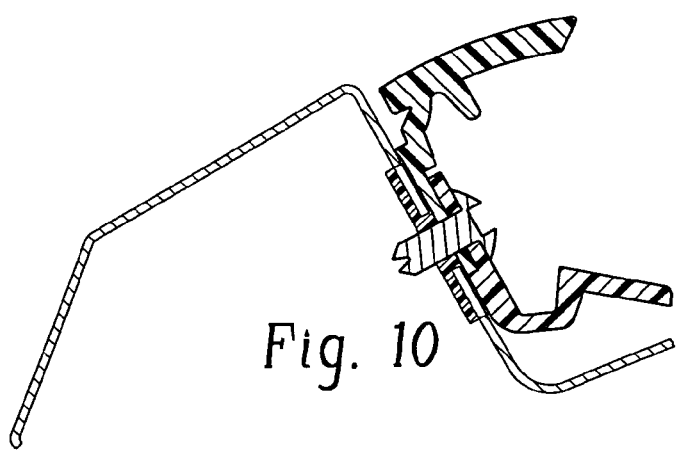
Figure 11:
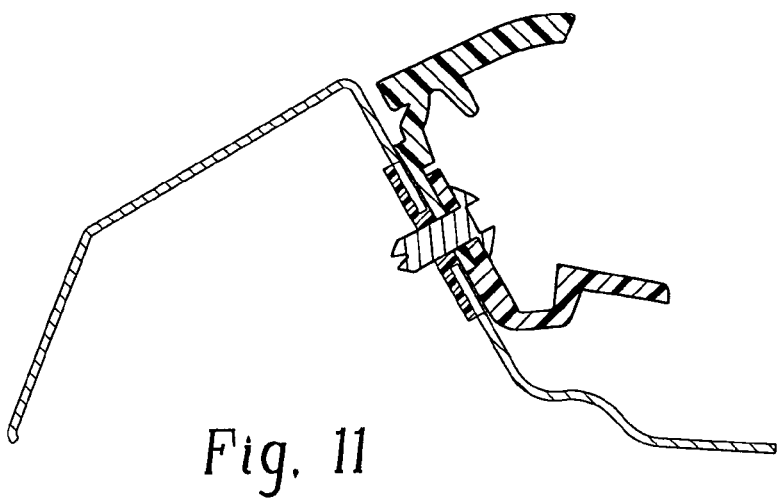
Figure 12:
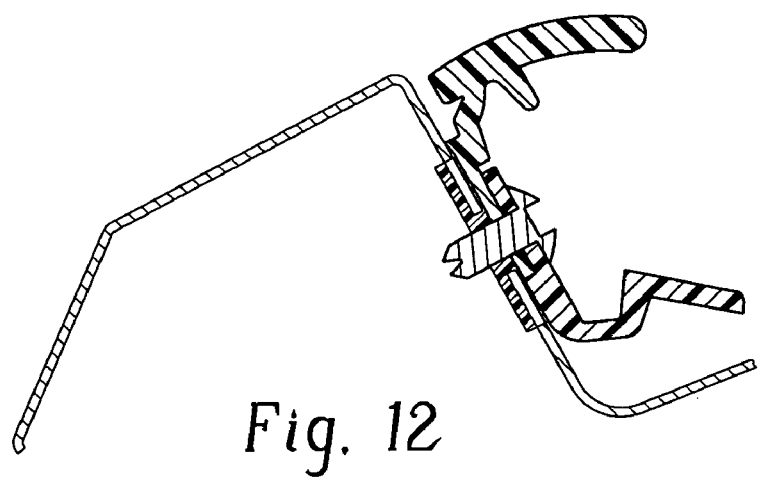
Figure 13:
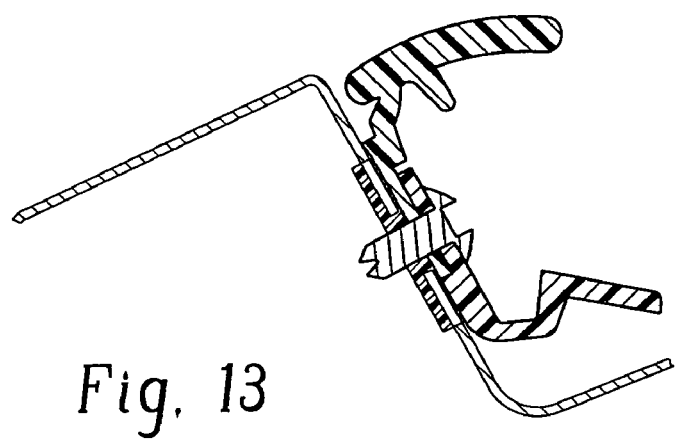
Figure 14:
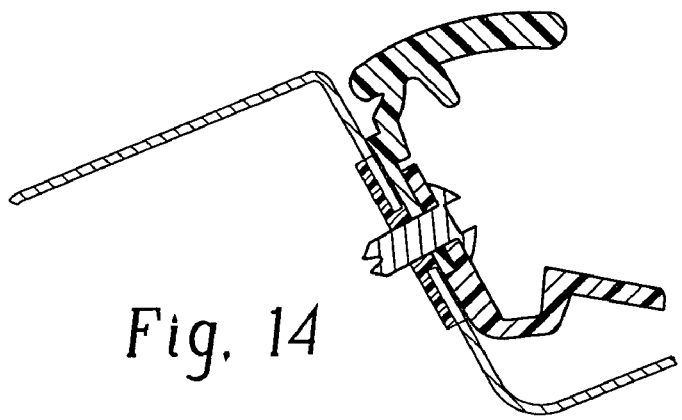
Figure 15:
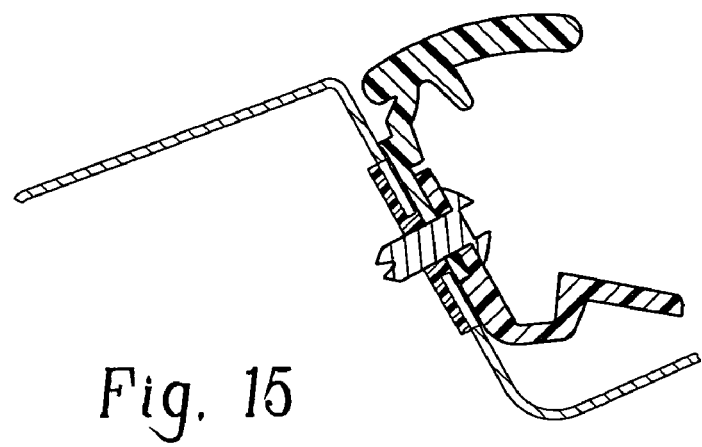
Figure 16:
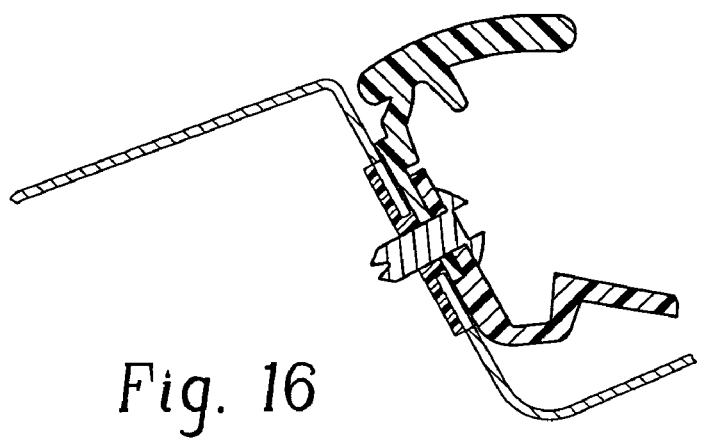
Figure 17:
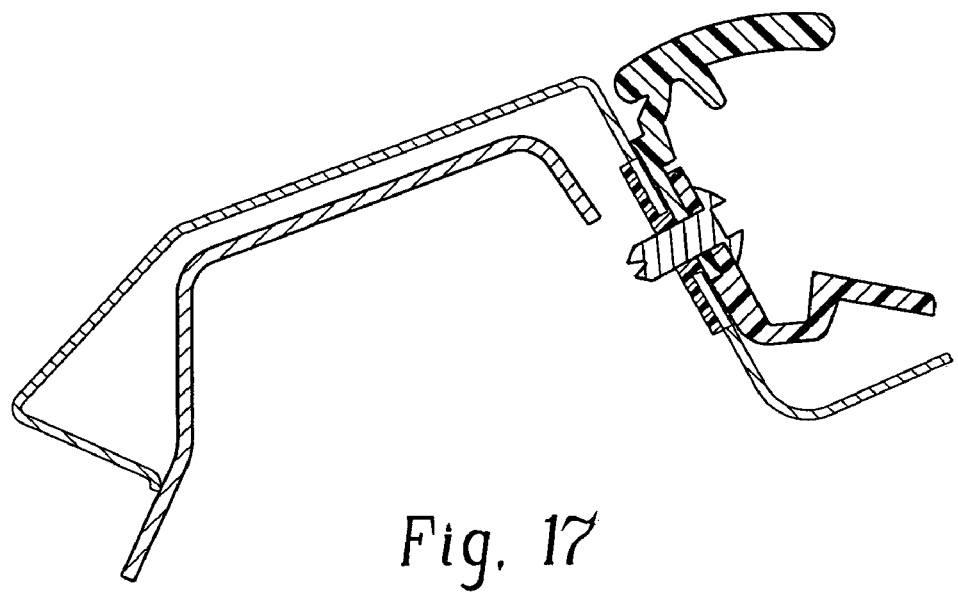
Figure 18:
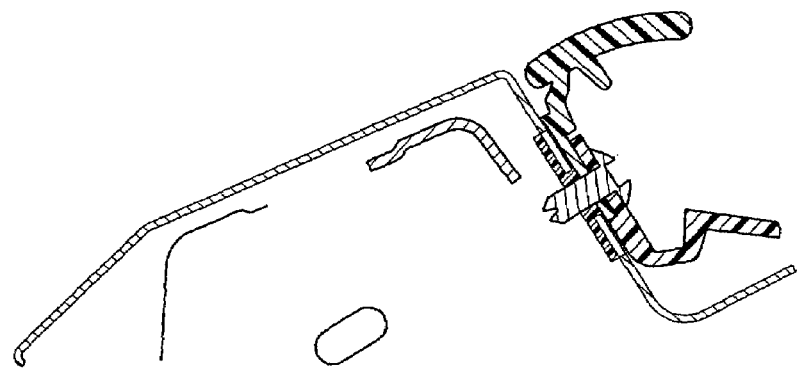
Figure 19:
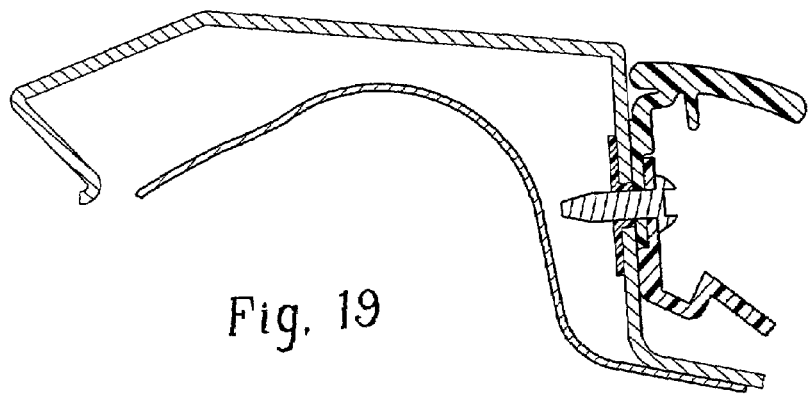
Figure 20:
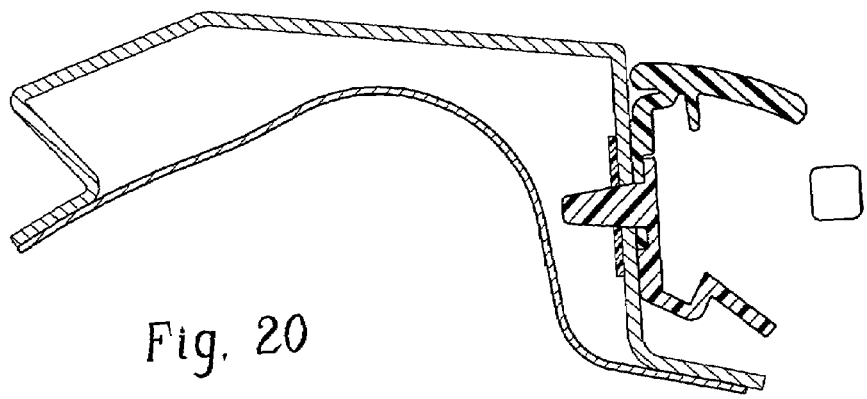
Figure 21:
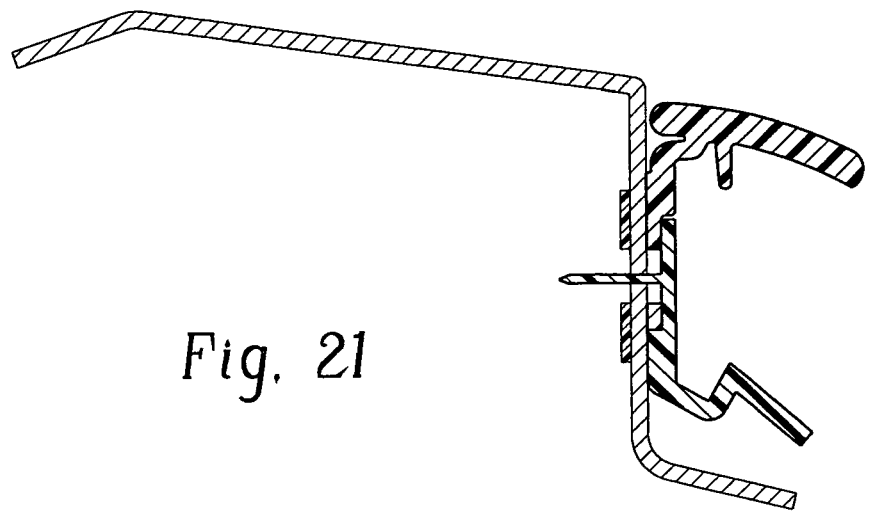
Figure 22:
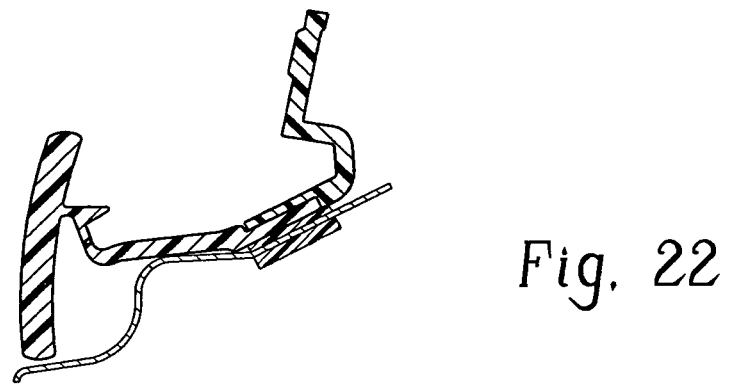
Figure 23:
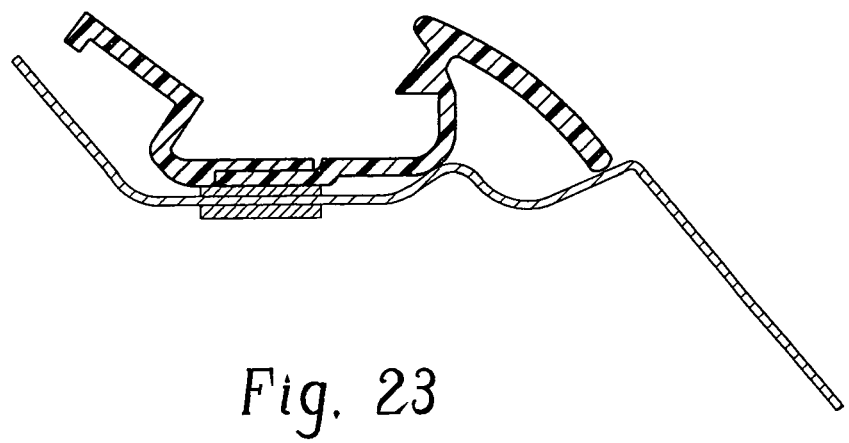
Figure 24:
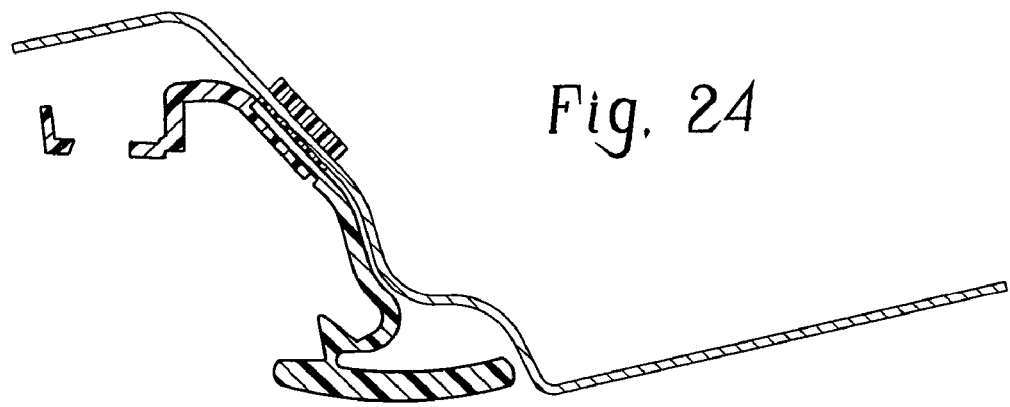
Figure 25:
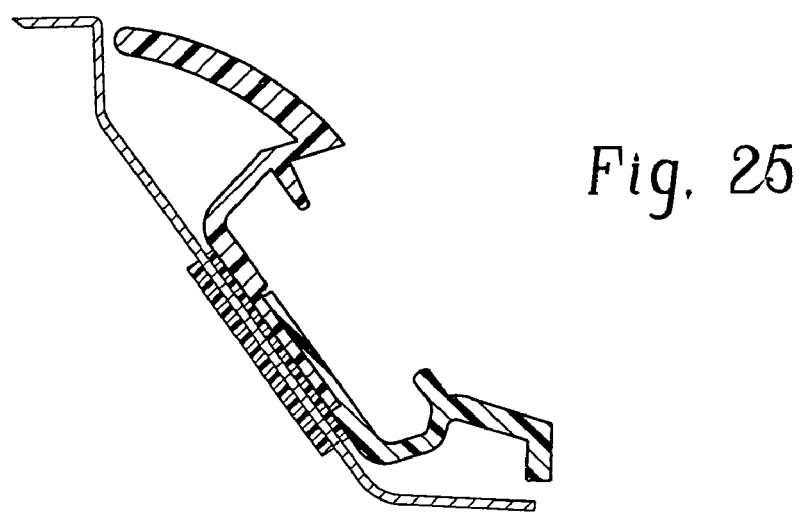
Figure 26:
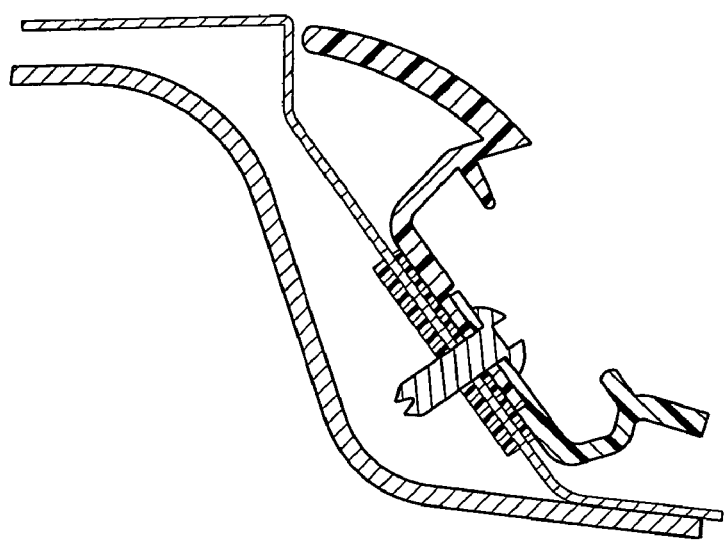
Figure 27:
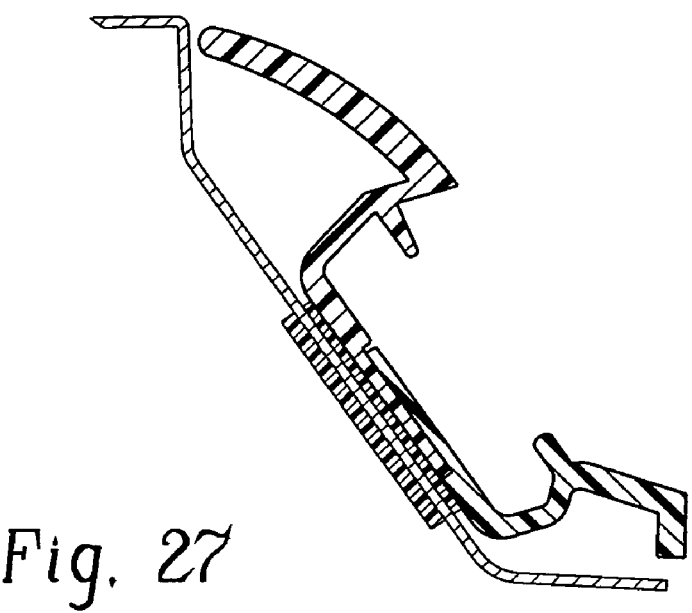
Figure 28:
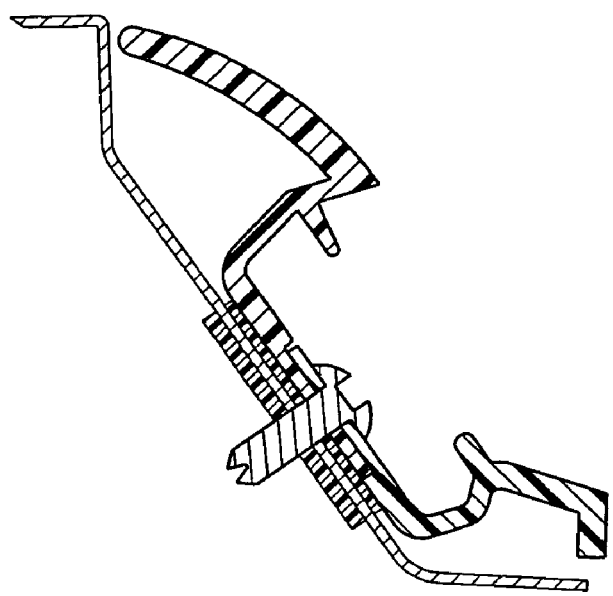

FIGS. 6-8 illustrate the one-piece retainer in greater detail. As will be described in greater detail below, the one-piece retainer is an all-plastic construction, and preferably injection molded. The retainer includes an outer show surface portion 130 that overlies the perimeter of the metal body side of the vehicle. In other words, it provides an aesthetically pleasing appearance or show surface. As exemplified in the various cross-sections of FIGS. 9-28, and also illustrated in FIGS. 29 and 30, the show surface transitions smoothly along and contours or blends into the vehicle surface surrounding the window. The show surface covers a cavity 132 that can also serve as a channel for water management and drainage of water from around the periphery of the window opening. A first retaining flange 140 is located inwardly from the show surface. The retaining flange extends outwardly from the cross-section of the plastic material toward an interior weatherseal receiving cavity 142 and is adapted to mechanically engage a recess 144 of the weatherseal WS shown in dotted line. The remainder of the first leg 146 recedes away from the retaining flange 140 at an acute angle and further merges in at an obtuse angle with generally planar base portion 148, which defines a fastening portion of the retainer to secure the retainer to the vehicle.

Figure 29:
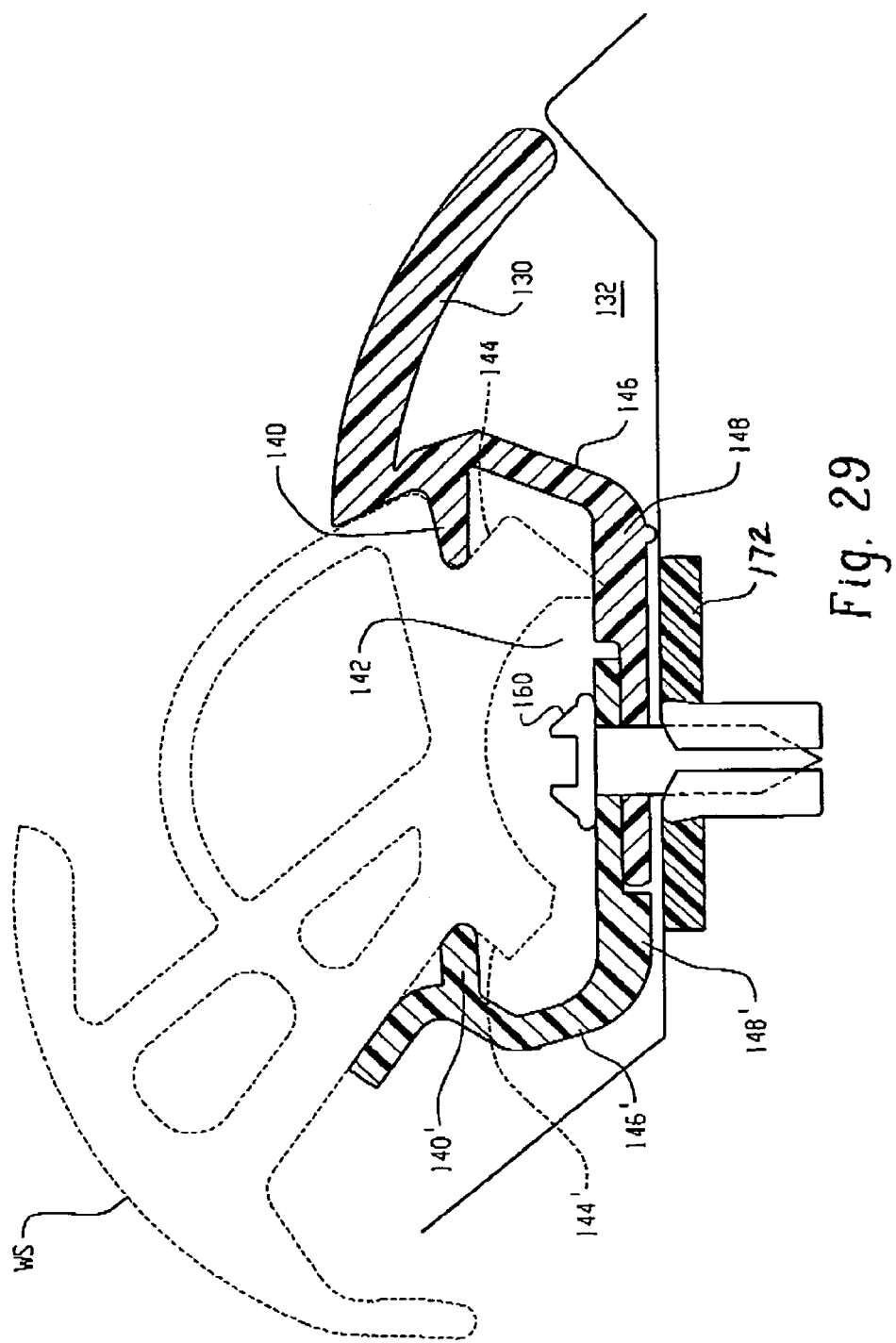
FIG. 29 is an enlarged cross-section through a B pillar portion of the retainer.

As will be appreciated, the second portion of the two-shot retainer is similar to the first portion, although it does not necessarily define a mirror image of the first portion. Where possible, similar components are identified by similar reference numerals with a prime suffix, i.e., retaining flange 140 and 140'. The weatherseal WS is mechanically engaged by the retaining flanges which together define a generally C-shaped cavity to hold the seal in place and engage the edge of the glass GL. Thus, as best illustrated in FIG. 29, the show surface 130 extends along the B pillar portion. When compared with the cross-sectional conformation in FIG. 30, which is along the A pillar and header portions of the retainer, the show surface extends generally parallel to leg 150 that is disposed adjacent the body side outer panel. It will also be appreciated that the weatherseal has a slightly different conformation as it extends along the header portion and engages the upper edge of the glass.

Figure 30:
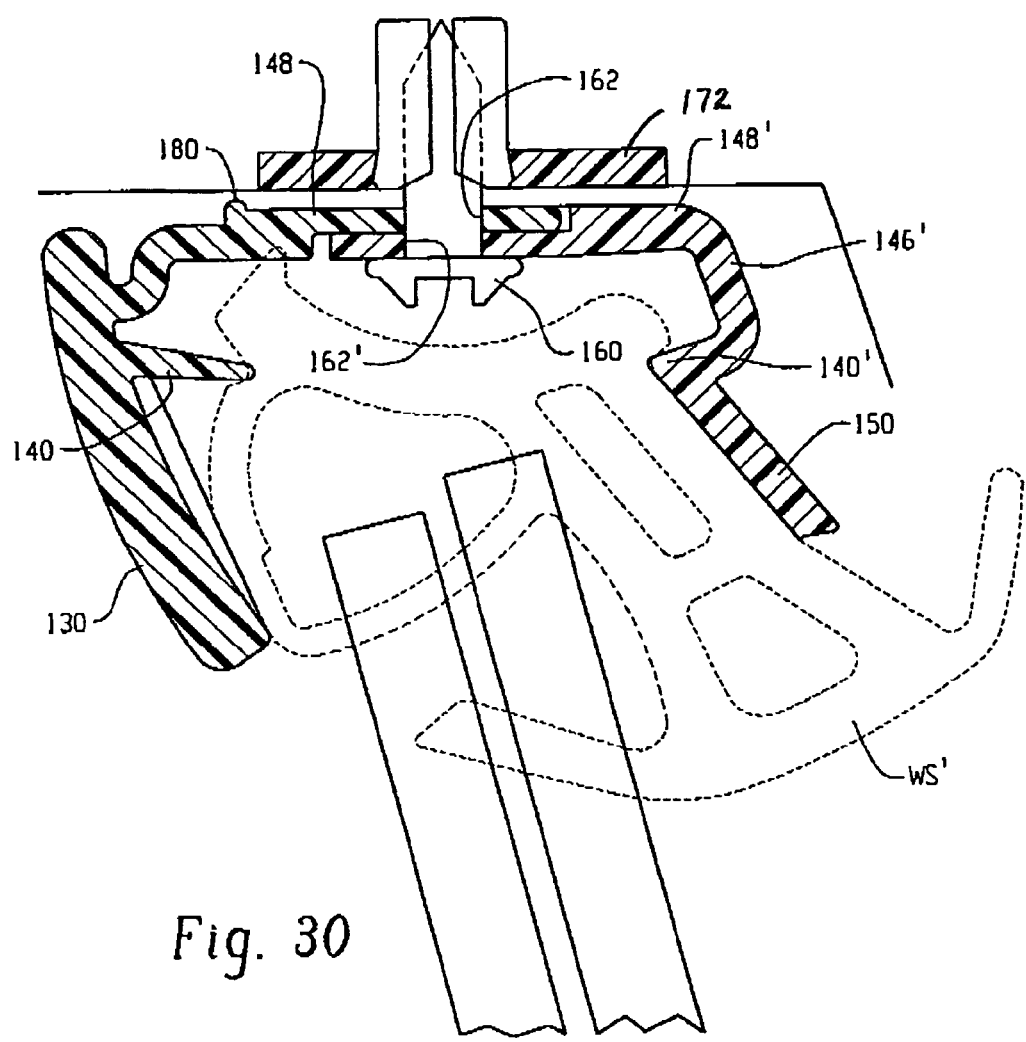
FIG. 30 is an enlarged cross-sectional view of the retainer with a weather seal show in dotted line along the A pillar/header portion of the retainer.

With continued reference to FIGS. 29 and 30, and renewed reference to FIG. 8, it will be appreciated that fasteners such as screws 160 extend through mating openings 162, 162' formed in the planar portions 148, 148', respectively, of the first and second portions of the retainer. The fastener extends through the aligned openings and secures the retainer to the vehicle body.

The openings 162, 162' are spaced apart as shown in FIG. 8, and interspersed between each of the fasteners in alternating arrangement are securing regions such as fusion bond regions or ultrasonic spot welds 170 to secure the first and second mold shot portions of the retainer. This affixes the first and second portions together, along with the fastener extending through the aligned openings to define a one-piece retainer prior to assembly to the vehicle.

A foam tape 172 (FIGS. 29 AND 30) includes a series of elongated openings 174 at spaced locations that correspond to the longitudinally spaced, aligned openings in the retainer that receive the fasteners. Preferably, the foam tape is adhesively secured to a rear face of the aligned leg portions 148,148' of the retainer. If desired, a tape guide 180 may also extend from the rear face of at least one of the rear faces of the leg portions.

The exemplary embodiment has been described with reference to a preferred embodiment. Obviously, modifications and alterations will occur to others upon reading and understanding the preceding detailed description. For example, various other manufacturing steps may be employed or in a different sequence. Likewise, different materials may be used or alternative processes without departing from the present invention. It is intended that the exemplary embodiment be construed as including all such modifications and alterations insofar as they come within the scope of the appended claims or the equivalents thereof.

What is claimed is:

1. A one-piece retainer for securing an associated weatherseal to an associated opening edge of an associated body side of an associated vehicle comprising:
   a first portion formed of a plastic material including:
      a seamless outer show surface portion for overlying an associated perimeter of the associated body side,
      a first leg including a first retaining flange, and
      a first generally planar base extending from the first leg;
   a second portion including:
      a second leg including a second retaining flange, and
      a second generally planar base extending from the second leg; and
   wherein a portion of the first generally planar base and a portion of the second generally planar base are disposed in overlapping relation and wherein a portion of the first generally planar base and a portion of the second generally planar base are fused together to define the one-piece retainer.

2. The invention of claim 1 wherein an inner surface of the outer show surface portion and the associated opening edge of the associated body side define a channel for managing water from around the associated opening edge.

3. The invention of claim 1 wherein the outer show surface portion transitions smoothly along an associated surface of the associated vehicle surrounding the associated opening edge.

4. The invention of claim 1 wherein the first and second retaining flanges together define a cavity to hold the associated weatherseal in place.

5. The invention of claim 1 wherein the first generally planar base includes a plurality of spaced apart first openings and the second generally planar base includes a plurality of spaced apart second openings for securing the one-piece retainer to the associated vehicle.

6. The invention of claim 5 wherein the plurality of first openings mate with the plurality of second openings to define a fastening portion for receiving an associated fastener for securing the one-piece retainer to the associated vehicle.

7. The invention of claim 1 wherein the fused portion of the first generally planar base and a portion of the second generally planar base are fused together by ultrasonic spot welds to define the one-piece retainer.

8. The invention of claim 1 further comprising a foam tape secured to a backside surface of the first and second legs.

9. The invention of claim 1 wherein the retainer is used to retain a weatherseal engaged by the first and second legs.

10. The invention of claim 9 wherein an inner surface of the outer show surface portion and the associated opening edge define a channel for managing water from around the associated opening edge.

11. The invention of claim 9 wherein the outer show surface portion overlies an associated body side perimeter of the associated window frame.

12. The invention of claim 9 wherein the first leg includes a first retaining flange and the second leg includes a second retaining flange.

13. The invention of claim 12 wherein the first and second retaining flanges together define a cavity to hold the weatherseal in place.

14. The invention of claim 9 wherein the generally planar base includes a plurality of spaced apart openings for receiving associated fasteners for securing the one-piece retainer to the associated vehicle.

15. The invention of claim 9 further comprising a foam tape secured to a backside surface of the first and second legs.

* * * * *